L. B. MOULTON.
WEIGHT INDICATOR.
APPLICATION FILED MAY 4, 1918.

1,294,298.

Patented Feb. 11, 1919.

Witnesses
E. R. Ruppert.

Inventor
L. B. Moulton
By Victor J. Evans
Attorney

UNITED STATES PATENT OFFICE.

LESLIE B. MOULTON, OF THE UNITED STATES ARMY, ASSIGNOR TO ELLA MOULTON, OF BAKER, OREGON.

WEIGHT-INDICATOR.

1,294,298.          Specification of Letters Patent.      Patented Feb. 11, 1919.

Application filed May 4, 1918. Serial No. 232,600.

*To all whom it may concern:*

Be it known that I, LESLIE B. MOULTON, a citizen of the United States, and of the United States Army, have invented new and useful Improvements in Weight-Indicators, of which the following is a specification.

This invention relates to new and useful improvements in weight indicators for vehicles and the principal object of the invention is to provide means for indicating the weight of the load the vehicle contains.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
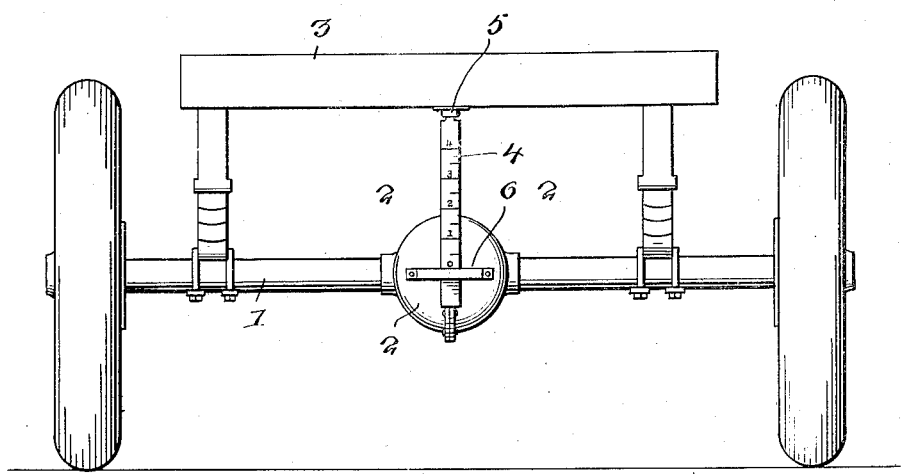
Figure 1 shows the invention applied to the rear part of an automobile.
Figure 2:
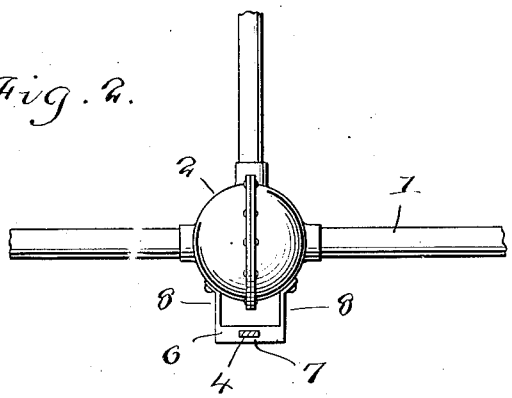
Fig. 2 is a section on line 2—2 of Fig. 1.

In these views the invention is shown as applied to the rear part of an automobile, though it will be understood that the invention may be used with other forms of vehicles, and in other locations.

In these views the rear axle of the automobile is shown at 1, the differential housing at 2 and a portion of the body of the automobile at 3. The invention comprises a graduated rod 4, which is connected to the body 3 by a universal joint 5. In this way the lower, or free end of the rod extends to a point adjacent the rear part of the differential. At this point I locate a plate 6 provided with a slot 7 therein, which receives the end of the rod, said plate being secured to the differential housing. As shown in the drawings the plate is provided with a pair of arms 8 which have their ends curved and bolted to the housing. If desired however I may form the plate with a single arm and secure it to the housing by one of the bolts which secure the two parts of the housing together.

The rod 4 must be made of sufficient length to remain in the slot 7 in the plate 6 at all times, and so as to obviate the danger of said rod leaving the slot on the re-bound of the body after passing over an obstruction on the road.

It will thus be seen that the weight of the load carried by the vehicle may be readily seen by a glance at the graduated rod as the position of said rod relative to the plate 6 will give the weight of the load.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. The combination with the body of the vehicle and its running gear, of a graduated rod carried by one of said parts and a combined guide and indicator carried by the other part and receiving the end of the rod.

2. The combination with the body of a vehicle and its running gear, of a graduated rod movably connected with the body and a slotted indicator plate connected with the running gear and coöperating with the rod, said rod engaging the slot in the plate.

3. The combination with the body of a vehicle and its running gear, of a graduated rod, flexible means connecting said rod with the body, a slotted plate connected with the running gear and engaging said rod.

4. The combination with the body of an automobile and its rear axle, of a graduated rod, a universal joint connecting said rod with the body, and a slotted plate connected with the rear axle and engaging said rod.

5. A weight indicator adapted to be attached to a vehicle comprising a graduated rod, means connecting one end of said rod to the body of the vehicle and holding the rod suspended from said body, and a combined guide and indicator carried by the running gear and coöperating with the rod to indicate the weight of the load in the body of the vehicle, the springs of the vehicle permitting the relative movement of the body of the running gear.

In testimony whereof I affix my signature.

LESLIE B. MOULTON